United States Patent
Tanimoto

(10) Patent No.: US 7,389,323 B2
(45) Date of Patent: Jun. 17, 2008

(54) COMMUNICATION DEVICE AND PROGRAM

(75) Inventor: Yoshifumi Tanimoto, Hirakata (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 864 days.

(21) Appl. No.: 10/345,902

(22) Filed: Jan. 16, 2003

(65) Prior Publication Data
US 2003/0140105 A1  Jul. 24, 2003

(30) Foreign Application Priority Data
Jan. 23, 2002  (JP) ............................. 2002-014876

(51) Int. Cl.
*G06F 11/00* (2006.01)
(52) U.S. Cl. .......................... 709/206; 709/239; 714/4; 714/43
(58) Field of Classification Search ................ 709/206, 709/239, 203; 714/4, 43
See application file for complete search history.

(56) References Cited

U.S. PATENT DOCUMENTS

| | | | |
|---|---|---|---|
| 6,510,454 B1* | 1/2003 | Walukiewicz | 709/206 |
| 2001/0032245 A1* | 10/2001 | Fodor | 709/206 |
| 2002/0099777 A1* | 7/2002 | Gupta et al. | 709/206 |
| 2002/0198948 A1* | 12/2002 | Lin | 709/206 |
| 2004/0049372 A1* | 3/2004 | Keller | 703/22 |

FOREIGN PATENT DOCUMENTS

| | | |
|---|---|---|
| JP | 10-084380 | 3/1998 |
| JP | 11-168614 | 6/1999 |
| JP | 2001-111628 | 4/2001 |
| JP | 2001-308922 | 11/2001 |

OTHER PUBLICATIONS

Yasushi Saito et al.; Manageability, Availability, and Performance in Porcupine: A Highly Scalable, Cluster-Based Mail Service; ACM Transactions on Computer Systems; vol. 18, No. 3; pp. 298-332; Aug. 2000.*

Tokio Matsu, "Secret of Notes You Can Send Mail Even When Home Server Stops!!", Lotus Notes Magazine, Japan, Softbank Corporation, Mar. 13, 1999, No. 29, pp. 93-95—English excerpt/abstract.

Use the Internet More Comfortable, Windows 2000 World, Japan IDG Japan, Inc., Mar. 1, 2001, vol. 6, No. 3, p. 127-131.

* cited by examiner

*Primary Examiner*—Kenneth R. Coulter
(74) *Attorney, Agent, or Firm*—Hogan & Hartson LLP

(57) ABSTRACT

A communication device includes a communication unit that communicates via a network and a control unit that controls to transmit an electronic mail message using the communication unit to a prescribed mail service normally, and using the communication unit to transmit the electronic mail message directly to a mail service of a receiver by using an Internet Protocol (IP) address of the mail server of the receiver obtained based on a receiver address of the electronic mail message when the prescribed mail server cannot be used.

26 Claims, 4 Drawing Sheets

COMMUNICATION DEVICE AND PROGRAM

FIELD OF THE INVENTION

The present invention relates to a technology for transmitting an electronic mail message by using a network.

DESCRIPTION OF THE RELATED ART

Accompanying recent developments in network technology, communications using electronic mail are being used. FIG. 4 is a drawing showing an example of a general communication using electronic mail. In the drawing, reference numerals 21, 24 are mail clients, 22, 23 are mail servers, and 25 is a Domain Name System (DNS) server. For example, when transmitting an electronic mail message from the mail client 21 to the mail client 24, first, the electronic mail message addressed to the mail client 24 is transmitted by using the Simple Mail Transfer Protocol (SMTP) or the like, to the mail server 22, which is provided within a domain where the mail client 21 belongs.

The mail server 22 obtains an Internet Protocol (IP) address of the mail server 23, which is provided within a domain where the mail client 24 of the receiver belongs, based on an electronic mail address of the receiver by searching the Mail Exchanger (MX) record of the DNS server 25. Then, by using the obtained IP address, the electronic mail message received from the mail client 21 is forwarded to the mail server 23. The mail server 23 receives and holds the electronic mail message addressed to the mail client 24 from the mail server 22. Then, by carrying out a retrieve request of the electronic mail message to the mail server 23 by the POP or the like from the mail client 24, the electronic mail message addressed to the mail client 24 that has been transmitted from the mail client 21 arrives at the mail client 24.

For example, even when transmitting the electronic mail message of the same contents to a plurality of receivers, the mail client 21 can transmit only one electronic mail message addressed to the plurality of receivers to the mail server 22. In this case, the mail server 22 distributes the electronic mail message to the mail server within a domain including each of the receivers. Therefore, there is a merit that a broadcast transmission can be carried out easily just by taking a transmission time for one electronic mail message.

In general, when transmitting the electronic mail message from the mail client 21, a fixed and unique mail server 22 is used at all times. For example, in an Internet facsimile machine or the like having a function for transmitting an image by using electronic mail, only one transmitting mail server to be used for the transmission of the electronic mail message can be registered, and the electronic mail message is transmitted to the registered unique mail server.

However, there is a problem that the electronic mail message cannot be transmitted when a failure occurs in the registered unique mail server. In the case of a non-emergency, the system can wait for the recovery of the mail server. However, for example, when the communication cannot be carried out with the registered mail server in a case of an emergency, there is a possibility for a business to stop, or for a society to be influenced.

SUMMARY OF THE INVENTION

The present invention was made in consideration to the above-described circumstance. An advantage of the present invention is to provide a communication device that does not influence a transmission of an electronic mail message even when a mail server used normally cannot be used, and a program for carrying out such a communication processing.

According to the present invention, a communication device that carries out a transmission of an electronic mail message includes a communication unit for communicating via a network. The communication device also includes a control unit that uses the communication unit, and normally transmits the electronic mail message to a prescribed mail server. Moreover, when the prescribed mail server cannot be used, the control unit uses the communication unit, and transmits the electronic mail message directly to a receiver by using an IP address of the receiver obtained based on the receiving address of the electronic mail message, or transmits the electronic mail message directly to a mail server of a receiver by using the IP address of the mail server of the receiver obtained based on the receiving address of the electronic mail message. In addition, according to the present invention, the communication device that carries out a transmission of an electronic mail message includes a communication unit for communicating via a network. The communication device also includes an operation unit for indicating an emergency by a user. In addition, the communication device also includes a control unit that uses the communication unit, and normally transmits the electronic mail message to a prescribed mail server. Moreover, when an indication of an emergency is made from the operation unit, the control unit uses the communication unit, and transmits the electronic mail message directly to a receiver by using the IP address of the receiver obtained based on a receiving address of the electronic mail message, or transmits the electronic mail message directly to a mail server of a receiver by using the IP address of the mail server of the receiver obtained based on the receiving address of the electronic mail message. The IP address of the receiver or the IP address of the mail server of the receiver can be obtained, for example, by searching the MX record (DNS record that associates a domain name and a receiver of the electronic mail) to the DNS server from the communication unit.

In addition, the present invention relates to a program to be executed by a computer, for normally transmitting an electronic mail message to a prescribed mail server. Moreover, the program of the present invention is for the computer to execute a processing to obtain the IP address of a receiver based on a receiving address of the electronic mail message and to transmit the electronic mail directly to the receiver by using the IP address of the receiver, or to obtain the IP address of a mail server of the receiver based on a receiving address of the electronic mail message and to transmit the electronic mail message directly to the mail server of the receiver by using the IP address of the mail server of the receiver, when the prescribed mail server cannot be used or when an indication of an emergency is made from a user.

According to the present invention, when the mail server used normally cannot be used, or when an indication of an emergency is made from the user, the electronic mail message is transmitted directly to the receiver or the mail server of the receiver. Therefore, the electronic mail message can be transmitted, for example, without an occurrence of a failure in the transmission or a delay in the transmission of an urgent electronic mail message. In other words, according to the present invention, when the mail server that is used normally cannot be used, or when transmitting the electronic mail message in an emergency, the IP address of the receiver or the IP address of the mail server of the receiver is obtained, and the electronic mail message is transmitted directly to the receiver or the mail server of the receiver. Accordingly, the transmission of the urgent electronic mail message is not disturbed. Moreover, the electronic mail message is not piled in the mail server of the domain of the transmitter in an emergency, and the electronic mail message can be transmitted to the receiver or the domain of the receiver without delay.

DETAILED DESCRIPTION OF THE PREFERRED EMBODIMENTS

Figure 1:
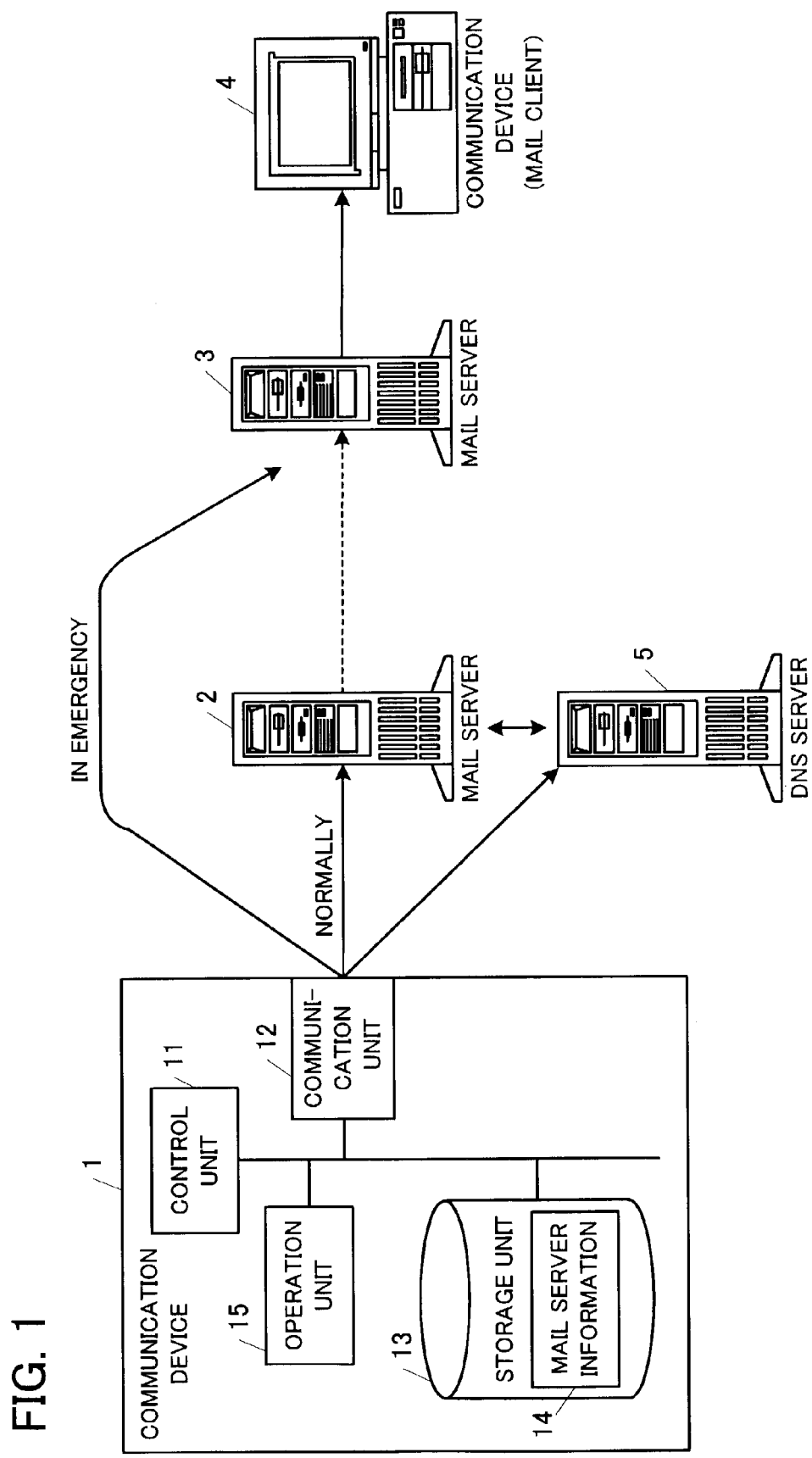
FIG. 1 is a drawing showing an example of a communication form in a communication system including an embodiment of the present invention.

FIG. 1 is a drawing showing an example of a communication form in a communication system including an embodiment of the present invention. In the drawing, the reference numerals 1, 4 are communication devices, 2, 3 are mail servers, 5 is DNS server, 11 is a control unit, 12 is a communication unit, 13 is a storage unit, 14 is a mail server information, and 15 is an operation unit. The communication device 1 is a communication device of the present invention. The communication device 1 can transmit the electronic mail message at least via a network.

The communication device 1 includes the control unit 11, the communication unit 12, the storage unit 13 or the like. The control unit 11 transmits information that should be transmitted, in a form of an electronic mail message from the communication unit 12. The communication device 1 normally transmits the electronic mail message by using the mail server 2 or the like in accordance with the mail server information 14 stored in the storage unit 13. Moreover, for example, when the mail server 2 cannot be used due to failure, or when an indication of an emergency is made from the operation unit 15, the electronic mail message is transmitted without using the mail server 2 that is used normally. In this case, first, the IP address of the mail server that has control over the domain of the receiver is obtained based on the address of the receiver of the electronic mail message to be transmitted. Then, the electronic mail message is transmitted directly from the communication unit 12 to the mail server of the receiver by using the obtained IP address. Further, in the case the receiver is a network device having a global IP address (IP address allocated formally from a public institution), the IP address of the domain of the receiver can be obtained, and the electronic mail message can be transmitted directly to the receiver. The IP address of the receiver or the IP address of the mail server of the receiver can be obtained by, for example, searching the MX record (record defining a host name which is the receiver of the electronic mail message addressed to the domain name used) to the DNS server 5.

The communication unit 12 can communicate with at least a mail server. Therefore, the communication unit 12 can be formed as a Local Area Network (LAN) interface, and can communication with a mail server on the LAN or a mail server connected via a gateway on the LAN. Alternatively, the communication unit 12 can be formed by a Network Control Unit (NCU), and a modem or the like, and can communicate with a mail server of a provider via a public line.

The storage unit 13 can store various information that is necessary to be saved in the communication device 1. As one type of information to be stored, an information relating to the mail server used normally can be stored as the mail server information 14.

The operation unit 15 includes a displaying unit, an inputting unit or the like. The operation unit 15 can accept various indication input from the user. For example, when transmitting the electronic mail message, the electronic mail address of the receiver can be input, or the transmission can indicated from the operation unit 15.

Further, the mail servers 2, 3 are mail servers that are used generally. The DNS server 5 is the DNS server that is also used generally. In addition, the communication device 4 can be a general communication device that can receive an electronic mail message. Moreover, the communication device 4 can be the communication device of the present invention.

Next, an outline of an example of the communication operation in the communication system including an embodiment of the present invention will be described. Information relating to the mail server 2 to be used normally is registered as the mail server information 14 in the communication device 1 in advance. In the general communication, for example, suppose that the mail server 2 is used. The operation for this case is the same as the conventional transmission operation of the electronic mail message. In other words, the communication device 1 transmits an electronic mail message by using the SMTP or the like to the mail server 2.

The mail server 2 searches the MX record of the DNS server 5 to obtain the IP address of the mail server (for example, the mail server 3) that is provided within a domain where the mail client of the receiver belongs, in accordance with the address of the receiver of the electronic mail message received from the communication device 1. Then, the mail server 2 forwards the electronic mail message received from the communication device 1 to the mail server 3. The mail server 3 receives and holds the electronic mail message forwarded from the mail server 2. Then, for example, when there is a retrieving request of the electronic mail message to the mail server 3 from the communication device 4 by the POP or the like, the mail server 3 forwards the electronic mail message being stored, and the electronic mail message transmitted from the communication device 1 arrives at the receiver.

Figure 2:
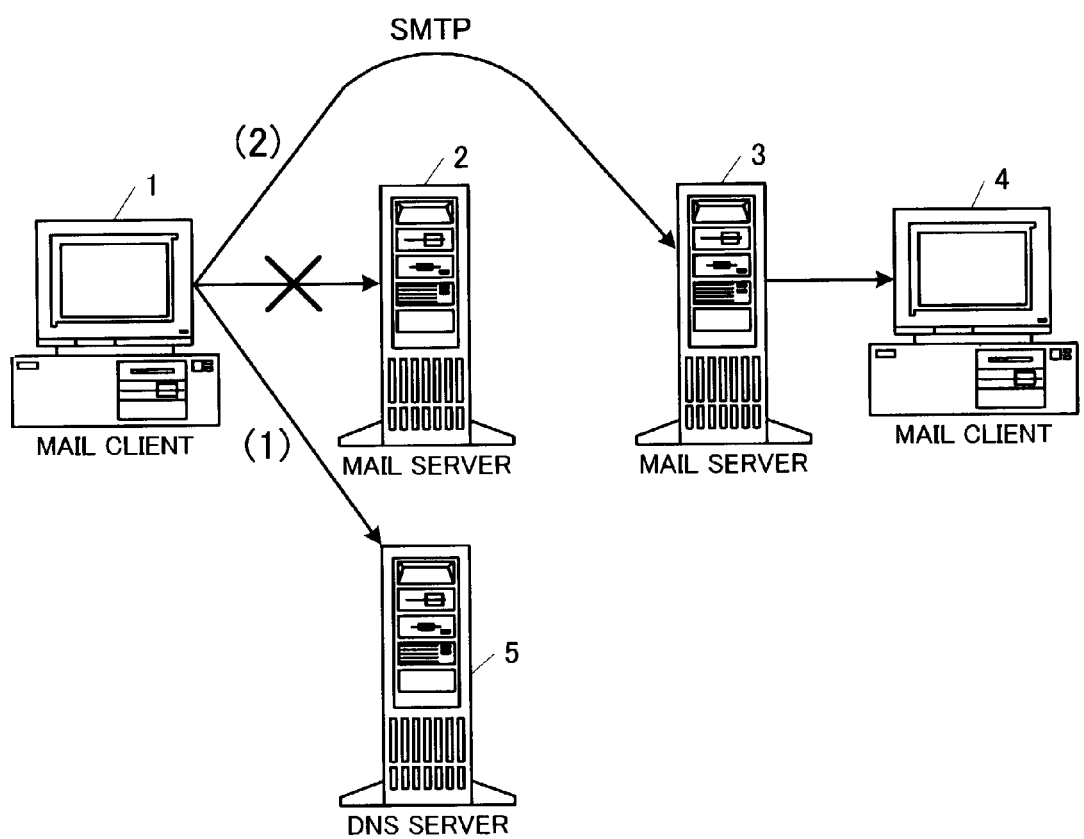
FIG. 2 is a drawing showing an example of a communication operation of when a communication cannot be carried out directly to a mail server used normally in the communication system including an embodiment of the present invention.

FIG. 2 is a drawing showing an outline of an example of a communication operation of when the communication cannot be carried out with the mail server used normally in the communication system including an embodiment of the present invention. Suppose that the electronic mail message cannot be transmitted from the communication device 1 to the mail server 2 due to a failure in the mail server 2 (shown with an "X" in FIG. 2). In such a case, first in (1), in accordance with the address of the receiver of the electronic mail message to be transmitted, the communication device 1 accesses the DNS server 5 and searches the MX record. In addition, the communication device 1 obtains the IP address of the mail server (here, mail server 3) that has control over the domain of the receiver. Then, in (2), by using the obtained IP address, the communication device 1 transmits the electronic mail message directly to the mail server 3 that has control over the domain of the receiver by using the SMTP or the like. The mail server 3 holds the electronic mail message transmitted from the communication device 1. The mail server 3 forwards the electronic mail message in response to the retrieving request by the POP or the like from the communication device 4, and the electronic mail message transmitted from the communication device 1 arrives at the receiver.

Further, there are cases when the IP address obtained based on the electronic mail address of the receiver is the global IP address of the communication device 4. In such a case, the electronic mail message can be transmitted directly to the communication device 4.

As described above, even when the mail server that is used normally cannot be used, the electronic mail message can be transmitted directly to the receiver or the mail server that has control over the domain of the receiver by obtaining the IP address based on the domain name of the receiver. Therefore, for example, even when it is necessary to transmit the electronic mail message urgently, a situation wherein the transmission cannot be carried out due to a failure or the like in the mail server that is used normally, can be avoided, and the urgent electronic mail message can be transmitted without disturbance.

Such an operation to transmit the electronic mail message by obtaining the IP address of the receiver or the mail server that has control over the domain of the receiver, is carried out for each of the receivers when a plurality of receivers are designated. For example, the same operation can be carried out at a normal transmission of the electronic mail message. However, when a plurality of receivers are designated as in a broadcast communication, it is advisable to request to the mail server used normally, than transmitting the electronic mail message directly to each of the receivers. When requesting the forwarding of the electronic mail message to the mail server used normally, a load applied to the communication device 1 can be reduced, and the communication can be ended by once?.

Moreover, with the mail server used normally, there are cases when there are many electronic mail messages that are to be distributed at one time, and the distribution is delayed. In the case such a situation occurs, for example, an indication of an urgent transmission can be made from the operation unit 15. In this case, even when the mail server used normally can communicate, the IP address of the receiver or the mail server having control over the domain of the receiver can be obtained, and the electronic mail message can be transmitted directly. Accordingly, the urgent electronic mail message can be transmitted to the receiver or the mail server of the destination without delay.

Figure 3:
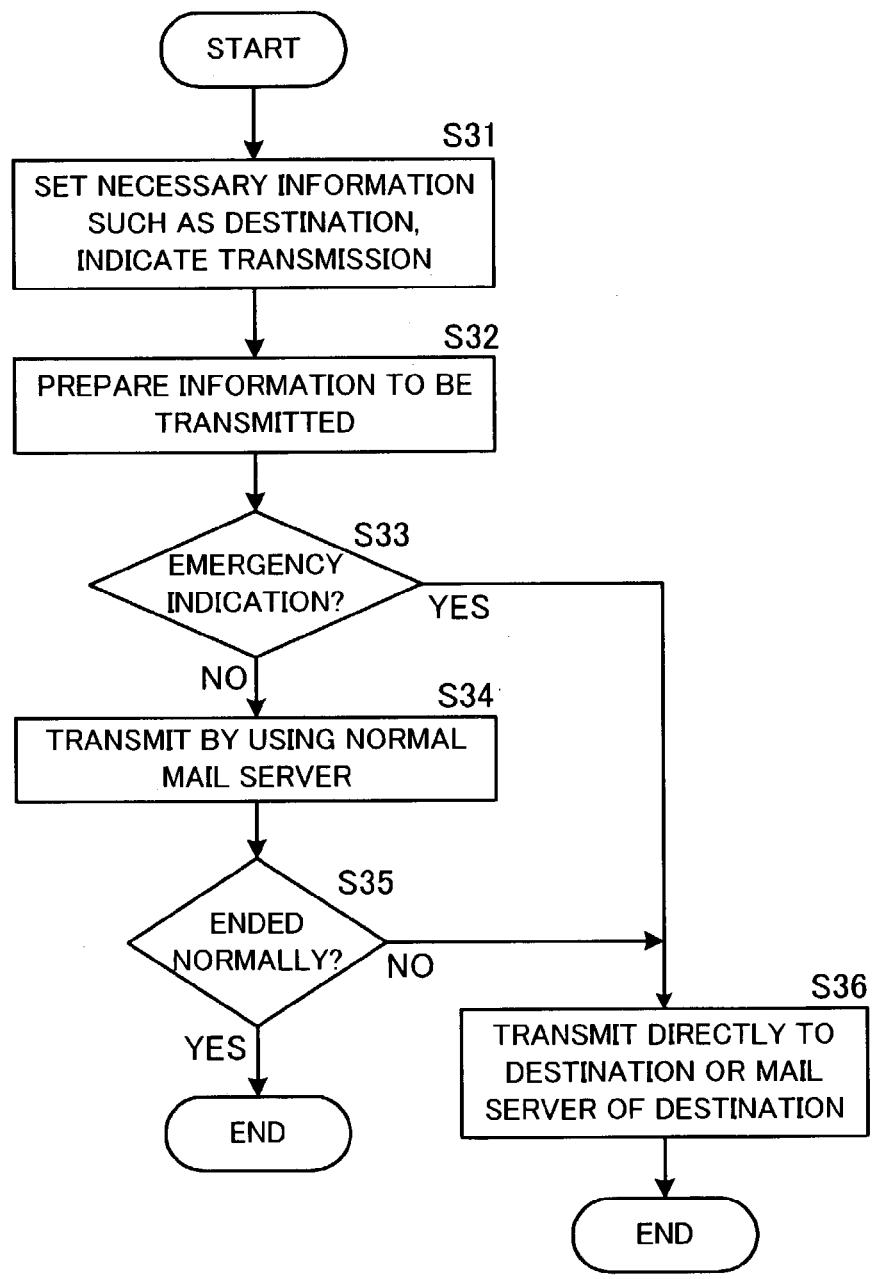
FIG. 3 is a flowchart showing an example of an operation of when transmitting an electronic mail message by a communication device according to an embodiment of the present invention.
Figure 4:
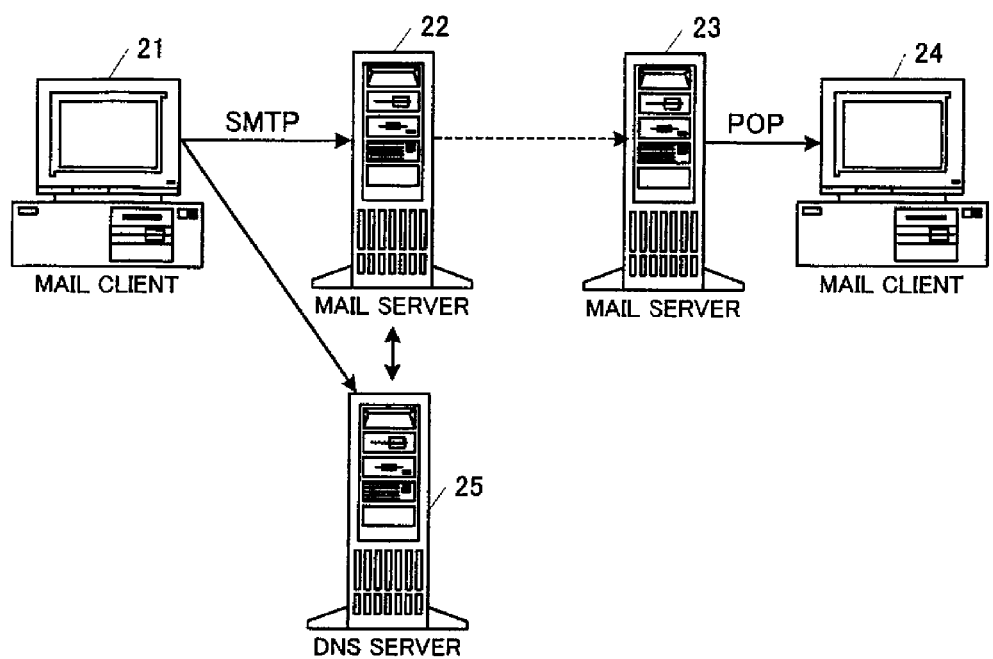
FIG. 4 is a drawing showing an example of a general communication using the electronic mail message.

FIG. 3 is a flowchart showing an example of an operation of when transmitting an electronic mail message by a communication device according to an embodiment of the present invention. FIG. 3 collectively shows an operation of when transmitting the electronic mail message by the communication device 1 that realizes an example of the above-described communication operation. First in step S31, a necessary setting, such as an inputting of the receiver, is carried out. At this time, when the user transmits an urgent electronic mail message, an indication of emergency is also made. When various settings are ended and the start of the communication is indicated, in step S32, the information to be transmitted as the electronic mail message is prepared. For example, when the communication device 1 is an Internet facsimile, in step S32, an image on an original is scanned by a scanning unit (not shown in the drawings). Then, the scanned image is accumulated in the storage unit 13.

In step S33, it is determined whether or not the user made an indication of an emergency. When the user did not make the indication for an emergency, in step S34, the electronic mail message is transmitted to the mail server used normally. In step S35, it is determined whether or not the transmission of the electronic mail message has ended normally. When the transmission has ended normally, the transmission processing of the electronic mail message ends.

When it is determined that the communication with the mail server used normally failed to be carried out normally in step S35, or when the indication of an emergency is made by the user in step S33, in step S36, the MX record is searched from the DNS server 5, and the IP address of the receiver or the mail server having control over the domain of the receiver is obtained. In addition, the electronic mail message is transmitted directly to the receiver or the mail server of the receiver.

As described above, even when the mail server used normally cannot be used, the electronic mail message can be transmitted directly to the receiver or the mail server that has control over the domain of the receiver. Further, when a transmission error occurs even by transmitting the electronic mail message directly to the receiver or the mail server that has control over the domain of the receiver, a fact of a communication error can be notified to the user, and the transmission processing can ends.

In this example, when the mail server used normally cannot be used, the electronic mail message is transmitted directly to the receiver or the mail server that has control over the domain of the receiver at all times. However, the present invention is not limited to this example, and for example, a rank can be applied to a degree of emergency, and when the mail server used normally cannot be used at the normal transmission, it can be made as an error as-is, or a recovery of the mail server wait. Then, in the case of a middle leveled emergency, as described above, a transmission to the mail server used normally can be attempted for once, and then, when the mail server used normally cannot be used, the electronic mail message can be transmitted directly to the receiver or the mail server having control over the domain of the receiver.

In the above-described operation example, in step S32, the information to be transmitted by the electronic mail message is scanned by the scanning unit or the like. However, the present invention is not limited to this example, and for example, a transmission request of the electronic mail message can be received from another remote device. In such a case, the information set in step S31 and the information to be transmitted that is prepared in step S32 are received from the remote device. The present invention can be used for such a server.

In the above-described operation example, the IP address of the receiver or the IP address of the mail server of the receiver is obtained by searching the MX record of the DNS server 5. However, the present invention is not limited to this example, and for example, when the urgent receiver is already determined, the IP address of the receiver or the IP address of the mail server of the receiver can be obtained in advance, and without using the DNS server 5 at the transmission, the electronic mail message can be transmitted directly to the receiver or the mail server of the receiver.

The above-described various operations according to the embodiments of the present invention can be described in a program or the like, and realized by executing the program or the like by the computer. In this case, the program and the data such as the mail server information can be stored in a remote storage unit such as a memory or a disk, and can also be recorded in various recording mediums. Alternatively, the program can be forwarded via a network to the computer, and the program can be executed by the computer.

What is claimed is:

1. A communication device in a mail client comprising:
means for communicating from a mail client via a network;

means for indicating an emergency from an operation unit in the communication device by a user; and means for transmitting an electronic mail message using the means for communicating from the mail client to a prescribed mail server normally, and using the means for communicating to completely bypass the prescribed mail server and transmit the electronic mail message directly from the mail client to a mail server of a receiver by using an Internet Protocol (IP) address of the mail server of the receiver obtained based on a receiver address of the electronic mail message when an emergency is indicated from the means for indicating an emergency, wherein the receiver is a receiving mail client.

2. The communication device according to claim 1, wherein the mail server of the receiver is a mail server having control over a domain of the receiver address.

3. The communication device according to claim 1, wherein the means for transmitting searches a Mail Exchanger (MX) record of a Domain Name System (DNS) server from the means for communicating, and obtains an IP address of the mail server of the receiver.

4. The communication device according to claim 1, wherein the means for transmitting transmits the electronic mail message directly to the mail server of the receiver by using the Simple Mail Transfer Protocol (SMTP) when the prescribed mail server cannot be used.

5. The communication device according to claim 1 further comprising a storage unit for storing information relating to the prescribed mail server as a mail sewer information of mail server used normally.

6. The communication device according to claim 5, wherein the electronic mail message is transmitted to the prescribed mail server by using the Simple Mail Transfer Protocol (SMTP).

7. A communication device in a mail client comprising:
means for communicating from the mail client via a network;
means for indicating an emergency from an operation unit in the communication device by a user; and
means for transmitting an electronic mail message using the means for communicating from the mail client to a prescribed mail server normally, and using the means for communicating to completely bypass the prescribed mail server and transmit the electronic mail message directly from the mail client to a receiver by using an Internet Protocol (IP) address of the receiver obtained based on a receiver address of the electronic mail message when an emergency is indicated from the means for indicating an emergency, wherein the receiver is a receiving mail client.

8. The communication device according to claim 7, wherein in a case the receiver address is a global IP address, when the prescribed mail server cannot be used, the means for transmitting transmits the electronic mail message directly to the receiver by using the IP address of the receiver.

9. The communication device according to claim 7, wherein the means for communicating searches a Mail Exchanger (MX) record of a Domain Name System (DNS) server from the means for communicating, and obtains the IP address of the receiver.

10. The communication device according to claim 7, wherein when the prescribed mail server cannot be used, the means for transmitting transmits the electronic mail message directly to the receiver by the Simple Mail Transfer Protocol (SMTP).

11. A computer-readable medium encoded with a computer program for a mail client to execute the steps of:
transmitting an electronic mail message from the mail client to a prescribed mail server normally;
indicating an emergency from an operation unit of the mail client by a user; and
transmitting an electronic mail message directly from the mail client to a mail server of a receiving mail client, completely bypassing the prescribed mail server, by using an Internet Protocol (IP) address of the mail server of the receiving mail client obtained based on a receiver address of the electronic mail message when an emergency is indicated from a user to the mail client.

12. A computer-readable medium encoded with a computer program for a mail client to execute a the steps of:
transmitting an electronic mail message from the mail client to a prescribed mail server normally;
indicating an emergency from an operation unit of the mail client by a user; and
transmitting an electronic mail message directly from the mail client to a receiving mail client, completely bypassing the prescribed mail server, by using an Internet Protocol (IP) address of the receiving mail client obtained based on a receiver address of the electronic mail message when an emergency is indicated from the operation unit by the user.

13. A communication device in a mail client comprising:
means for communicating from the mail client via a network;
means for indicating an emergency from an operation unit in the communication device by a user; and
means for transmitting an electronic mail message using the means for communicating to transmit an electronic mail from the mail client to a prescribed mail server normally, and using the means for communicating to completely bypass the prescribed mail server and transmit the electronic mail message directly from the mail client to a mail server of a receiver by using an Internet Protocol (IF) address of the mail server of the receiver obtained based on a receiver address of the electronic mail message when an emergency is indicated from the operation unit or when the prescribed mail server cannot be used, wherein the receiver is a receiving mail client.

14. The communication device according to claim 13, wherein the mail server of the receiver is a mail server having control over a domain of the receiving address.

15. The communication device according to claim 13, wherein the means for transmitting searches a Mail Exchanger (MX) record of a Domain Name System (DNS) server from the means for communicating and obtains the IP address of the mail server of the receiver.

16. The communication device according to claim 13, wherein when the prescribed mail server cannot be used, the means for transmitting transmits the electronic mail message directly to the mail server of the receiver by the Simple Mail Transfer Protocol (SMTP).

17. The communication device according to claim 13, further comprising a storage unit for storing information relating to the prescribed mail server as mail server information of a mail server used normally.

18. The communication device according to claim 17, wherein the electronic mail message is transmitted to the prescribed mail server by using the Simple Mail Transfer Protocol (SMTP).

19. A communication device in a mail client comprising:
means for communicating from the mail client via a network;

means for indicating an emergency from an operation unit in the communication device by a user; and means for transmitting an electronic mail message using the means for communicating from the mail client to a prescribed mail server normally, and using the means for communicating to completely bypass the prescribed mail server and transmit the electronic mail message directly from the mail client to a receiver by using the Internet Protocol (IP) address of the receiver obtained based on a receiver address of the electronic mail message when an emergency is indicated from the operation unit or when the prescribed mail server cannot be used, wherein the receiver is a receiving mail client.

20. The communication device according to claim 19, wherein in a case the receiver address is a global IP address, the means for transmitting transmits the electronic mail message directly to the receiver by using the IP address of the receiver when the prescribed mail server cannot be used.

21. The communication means according to claim 19, wherein the means for transmitting searches a Mail Exchanger (MX) record of a Domain Name System (DNS) server from the means for communicating, and obtains the IP address of the receiver.

22. The communication device according to claim 19, wherein the means for transmitting transmits the electronic mail message directly to the receiver by the Simple Mail Transfer Protocol (SMTP) when the prescribed mail server cannot be used.

23. A computer-readable medium encoded with a computer program for a mail client to execute the steps of:
  transmitting an electronic mail message from the mail client to a prescribed mail server normally;
  indicating an emergency from an operation unit of the mail client by a user; and
  transmitting an electronic mail message directly from the mail client to a mail server of a receiving mail client, completely bypassing the prescribed mail server, by using an Internet Protocol (IP) address of the mail server of the receiving mail client obtained based on a receiver address of the electronic mail message when an emergency is indicated from the operation unit or when the prescribed mail server cannot be used.

24. The computer-readable medium encoded with a computer program according to claim 23, wherein the mail server of the receiving mail client is a mail server that has control over a domain of the receiver address.

25. A computer-readable medium encoded with a computer program for a mail client to execute the steps of:
  transmitting an electronic mail message from the mail client to a prescribed mail server normally;
  indicating an emergency from an operation unit of the mail client by a user; and
  transmitting an electronic mail message directly from the mail client to a receiving mail client, completely bypassing the prescribed mail server, by using an Internet Protocol (IP) address of the receiving mail client obtained based on a receiver address of the electronic mail message -when an emergency is indicated from the operation unit or when the prescribed mail server cannot be used.

26. A communication device comprising:
  a communication unit of a mail client that communicates via a network;
  an operation unit of the mail client for indicating an emergency by a user; and
  a control unit that controls to transmit an electronic mail message using the communication unit from the mail client to a prescribed mail service normally, and using the communication unit to completely bypass the prescribed mail server and transmit the electronic mail message from the mail client directly to a mail service of a receiving mail client by using an Internet Protocol (IP) address of the mail server of the receiving mail client obtained based on a receiver address of the electronic mail message when an emergency is indicated from the operation unit or when the prescribed mail server cannot be used.

* * * * *